US010744995B2

(12) United States Patent
Kohlböck

(10) Patent No.: US 10,744,995 B2
(45) Date of Patent: Aug. 18, 2020

(54) METHOD FOR CORRECTING A DRAG TORQUE CURVE OF AT LEAST ONE ROTATABLY MOUNTED MACHINE ELEMENT

(71) Applicant: Magna Powertrain GmbH & Co KG, Lannach (AT)

(72) Inventor: Markus Kohlböck, Graz (AT)

(73) Assignee: MAGNA POWERTRAIN GMBH & CO KG, Lannach (AT)

(*) Notice: Subject to any disclaimer, the term of this patent is extended or adjusted under 35 U.S.C. 154(b) by 52 days.

(21) Appl. No.: 16/021,111

(22) Filed: Jun. 28, 2018

(65) Prior Publication Data
US 2019/0001951 A1 Jan. 3, 2019

(30) Foreign Application Priority Data
Jun. 30, 2017 (DE) .......................... 10 2017 211 227

(51) Int. Cl.
*B60W 10/02* (2006.01)
*B60W 10/108* (2012.01)
(Continued)

(52) U.S. Cl.
CPC ............ *B60W 10/02* (2013.01); *B60W 10/06* (2013.01); *B60W 10/108* (2013.01); *F16D 48/06* (2013.01);
(Continued)

(58) Field of Classification Search
CPC .... B60W 10/02; B60W 10/06; B60W 10/108; F16D 48/06; F16D 2500/10431;
(Continued)

(56) References Cited

U.S. PATENT DOCUMENTS

| 2011/0112709 A1 | 5/2011 | Park et al. |
| 2012/0220422 A1* | 8/2012 | Wurthner .............. B60W 10/02 477/79 |

(Continued)

FOREIGN PATENT DOCUMENTS

| DE | 10243495 A1 | 3/2004 |
| DE | 102008032477 A1 | 1/2010 |

(Continued)

OTHER PUBLICATIONS

Search Report dated Jun. 15, 2018 in corresponding German Patent Application No. DE102017211227.1.
Korean Search Report for corresponding Korean publication No. 10-2018-0075202 (no English translation provided).

* cited by examiner

*Primary Examiner* — David J Hlavka
(74) *Attorney, Agent, or Firm* — Dickinson Wright PLLC

(57) ABSTRACT

The present invention relates to a method for correcting a drag torque curve of at least one rotatable machine element of which the drag torque is dependent on the rotational speed of the machine element, wherein the drag torque curve has a plurality of rotational speed ranges which are different from one another, in which the drag torque curve in each rotational speed range is corrected between a measured rotational speed of the machine element and a calculated rotational speed of the machine element on the basis of a rotational speed deviation in the respective rotational speed range.

11 Claims, 2 Drawing Sheets

(51) Int. Cl.
  *B60W 10/06* (2006.01)
  *F16D 48/06* (2006.01)
  *F16H 59/46* (2006.01)
(52) U.S. Cl.
  CPC .............. *F16D 2500/10412* (2013.01); *F16D 2500/10431* (2013.01); *F16D 2500/70605* (2013.01); *F16H 59/46* (2013.01)
(58) Field of Classification Search
  CPC . F16D 2500/10412; F16D 2500/70605; F16D 2500/706; F16D 2500/1107; F16D 2500/506; F16H 59/46; B60K 23/08
  See application file for complete search history.

(56) References Cited

U.S. PATENT DOCUMENTS

| | | | | |
|---|---|---|---|---|
| 2014/0136040 | A1* | 5/2014 | Scholz | B60W 10/06 701/22 |
| 2016/0214610 | A1* | 7/2016 | Kotsuji | B60K 6/48 |
| 2018/0362020 | A1* | 12/2018 | Kobler | B60K 6/30 |

FOREIGN PATENT DOCUMENTS

| | | |
|---|---|---|
| DE | 102009005378 B4 | 5/2013 |
| DE | 102014016376 A1 | 5/2016 |
| KR | 1020110049934 | 5/2011 |
| WO | WO2014166819 A2 | 10/2014 |

METHOD FOR CORRECTING A DRAG TORQUE CURVE OF AT LEAST ONE ROTATABLY MOUNTED MACHINE ELEMENT

CROSS-REFERENCE TO RELATED APPLICATIONS

This application claims the benefit and priority of German Application No. 10 2017 211 227.1, filed on Jun. 30, 2017. The entire disclosure of the above application is incorporated herein by reference.

TECHNICAL FIELD

The present invention relates to a method for correcting a drag torque curve of at least one rotatably mounted machine element, such as for example a torque transmission section of a vehicle drive train, by means of which a drive torque can be optionally transmitted to a secondary axle—for example a rear wheel axle—for purposes of all-wheel drive.

BACKGROUND

This section provides background information related to the present disclosure which is not necessarily prior art.

A drive train with switch-on/switch-off all-wheel drive may for example comprise a power transfer unit, by means of which a drive torque can be divided on demand between a number of axles of the vehicle. For example in the case of the power transfer unit described in DE 10 2008 032 477 A1, a coupling unit which is also referred to as an all-wheel clutch is used for this, by means of which a variable proportion of a torque can be transmitted on demand from an input shaft to a secondary axle of the vehicle. In the case of a so-called "torque-on-demand" power transfer unit, the wheels of the primary axle are permanently driven, whereas a variable proportion of the drive torque can be transmitted on demand to the wheels of the secondary axle by means of the coupling unit mentioned. The torque transmission to the secondary axle takes place in this case over a torque transmission section of the drive train, which may for example be, inter alia, a cardan shaft, including an axle drive, connected thereto in terms of drive, along with a differential of the secondary axle.

Since the torque transmission section in question also rotates when the all-wheel drive is switched off, because it is dragged along by the secondary axle, to reduce undesired frictional losses when the all-wheel drive is switched off the torque transmission section may be shut down by a shutting-down device, as described for example in the documents DE 10 2009 005 378 B4 and WO 2014/166819 A2. This shutting-down functionality is occasionally also referred to by the term "disconnect". Provided in particular in this case for achieving the disconnect functionality in question is a separating or disconnecting clutch, which in the closed state establishes a connection that is effective in terms of drive between the torque transmission section and the secondary axle, whereas the drive connection between the torque transmission section and the secondary axle is interrupted when the disconnect clutch is open. If, therefore, with the all-wheel drive switched off, or in two-wheel drive mode, the disconnect clutch is opened, this has the effect that the torque transmission section in question is uncoupled from the drive train, and in particular from the secondary axle, and rotates freely, until its rotation stops as a result of drag torques that are present. The drag torque of the torque transmission section is in this case dependent, inter alia, on the rotational speed of the torque transmission section, since for example its bearing friction tends to increase with increasing rotational speed.

If, once the all-wheel drive has been switched off and the torque transmission section has been shut down, the secondary axle is to be switched on again for purposes of all-wheel drive, on the one hand the disconnect clutch and on the other hand the all-wheel clutch must be engaged again, in order to establish a connection that is effective in terms of drive between the primary axle and the secondary axle. However, before the disconnect clutch can be engaged, the torque transmission section must be set in rotation again by means of the all-wheel clutch and synchronized with the rotation of the secondary axle. When doing so, the torque transmission section should be accelerated uniformly, and preferably with constant acceleration, in order to be able to predict as exactly as possible the time at which the disconnect clutch is to be engaged. Therefore, exact knowledge of the speed-dependent profile of the drag curve of the torque transmission section is needed in order to be able to engage the all-wheel clutch on the basis of the speed-dependent profile of the drag torque of the torque transmission section in such a way that the torque transmission section is accelerated as uniformly as possible, and in order to be able to predict as exactly as possible the time for the closing of the disconnect clutch.

The drag torque curve can in fact be determined in advance on a test bench; since, however, the drag torque curve is subject to various variable influences, such as for example varying bearing friction, other production-related tolerances, temperature influences or for example effects of wear, it would be desirable to be able to update and correct the drag torque curve of a torque transmission section of a vehicle drive train while in the process of driving the vehicle.

The invention is consequently based on the object of satisfying this desire.

SUMMARY

This section provides a general summary of the disclosure, and is not a comprehensive disclosure of its full scope or all of its features.

This object is achieved by a method according to Claim 1 for correcting a drag torque curve of at least one rotatably mounted machine element, and in particular by the drag torque curve in each rotational speed range being corrected between a measured rotational speed of the machine element and a calculated rotational speed of the machine element on the basis of a rotational speed deviation in the respective rotational speed range.

There is therefore no global correction of the drag torque curve, as would be the case for example if, at any rotational speed, a measured drag torque were compared with a calculated drag torque and the entire drag torque curve were corrected on the basis of this comparison; rather, the invention is based on the idea of notionally dividing up the drag torque curve into a number of rotational speed ranges, for example a lower rotational speed range, a mid rotational speed range and an upper rotational rotational speed range, and in each of these rotational speed ranges performing a correction of the drag torque curve that is substantially independent of the correction of the other rotational speed ranges. In this way it is possible to make allowance for the fact that the drag torque curve may behave quite differently in different rotational speed ranges, which may be attributable for example to the speed-dependent bearing friction having a quite different effect on the drag torque curve in the individual rotational speed ranges. It is therefore envisaged according to the invention to correct the drag torque curve in each rotational speed range on the basis of a rotational speed deviation that is obtained in the respective rotational speed range between a measured rotational speed and a calculated rotational speed of the machine element.

The determination of the rotational speed deviation, and consequently the correction of the drag torque curve, may take place when, and in particular every time when, the torque transmission section is uncoupled, in particular when the torque transmission section is decoupled by means of the first clutch from the drive and by means of the second clutch from the output, or when after or during the switching off of the all-wheel drive by disengaging the all-wheel clutch the disconnect clutch is also disengaged. After the disengaging of the disconnect clutch, the torque transmission section in this case runs down, until its rotation stops. When doing so, the rotational energy of the torque transmission section is consumed by the drag torque of the torque transmission section, owing to friction, after the opening of the disconnect clutch, until its rotational speed is zero. During this running-out phase of the torque transmission section after the opening of the disconnect clutch, while running through the respective rotational speed range the rotational speed in the respective rotational speed range is on the one hand calculated and on the other hand measured, so that the rotational speed deviation in the respective rotational speed ranges can be determined on the basis of the measured rotational speed and the correspondingly calculated rotational speed of the torque transmission section by forming the difference, in order to be able subsequently on the basis of these rotational speed deviations to correct the drag torque curve already for the next engaging operation of the all-wheel clutch or disconnect clutch.

There now follows a discussion of preferred embodiments of the invention. Other embodiments may emerge from the dependent claims, the description of the figures and the figures themselves.

Thus, according to one embodiment, it is provided that the drag torque curve in each rotational speed range is corrected in that a correction factor which is assigned to the respective rotational speed range is determined on the basis of the rotational speed deviation of the respective rotational speed range, on the basis of which correction factor the drag torque curve in the respective rotational speed range is modified, in particular multiplied. For example, a specific correction increment for the modification of a correction factor may be assigned to each rotational speed deviation on the basis of a look-up table. As an alternative to this, such an assignment may also take place by means of a function which assigns a specific correction increment to each rotational speed deviation.

According to a simple embodiment, for example, a linear dependence between the rotational speed deviation and the correction increment, as a result of which the correction increment increases with increasing speed, may be stored. During a current pass through the loop, the correction increment is in this case added to a correction factor from a previous pass through the loop, in order in this way to obtain the correction factor for the current pass through the loop. Depending on whether the ascertained rotational speed deviation between the measured rotational speed and the calculated rotational speed is positive or negative, this produces a positive or negative correction increment, which is added to the correction factor of a previous pass through the loop. If, consequently, in the current pass through the loop the current correction factor is applied to the torque drag curve in the respective rotational speed range, this has the effect that, depending on the operational sign of the correction increment, the drag torque curve in the respective rotational speed range is increased or decreased.

According to a further embodiment, the rotational speed deviation of the respective rotational speed range may be determined in that the rotational speed differences which are determined at different times between the measured rotational speed of the machine element and the calculated rotational speed of the machine element in the respective rotational speed range are summed. The rotational speed deviation is therefore a summated error that is obtained over the respective rotational speed range, so that individual measuring errors in the respective rotational speed range only have an insignificant effect on the correction of the drag torque curve.

According to a further embodiment, in each rotational speed range the rotational speed which has been measured at first is used as a starting value for calculating the rotational speed. If, therefore, the individual rotational speed ranges are passed through one after the other during the running down of the machine element, in each rotational speed range at the beginning the modelled or calculated rotational speed is made equal to the rotational speed that is measured first in the respective rotational speed range. In this way, the calculation model is adapted to the actually prevailing drag torque states, whereupon the calculation model can, from this time onwards, calculate the rotational speed on the basis of the rotational speed measured at first in the respective rotational speed range.

Since the rotational speed deviations in the individual rotational speed ranges can be of different magnitudes, to avoid discontinuities in the corrected drag torque curve it may be provided according to a further embodiment that, in a predefined rotational speed band about a limiting rotational speed which separates or delimits the first rotational speed range from an adjacent second rotational speed range, the drag torque curve is corrected on the basis of the two correction factors which are assigned to the two adjacent rotational speed ranges. In other words, the rotational speed band in which the correction factor of the one rotational speed range has an influence on the correction of the other rotational speed range, and vice versa, is defined between two adjacent rotational speed ranges.

For example, the correction of the drag torque curve in the predefined rotational speed band about the limiting rotational speed may take place between two adjacent rotational speed ranges in that in the first rotational speed range the correction factor which is assigned to the first rotational speed range is increasingly reduced and the correction factor which is assigned to the second rotational speed range is increasingly enlarged as the rotational speed increasingly approaches the limiting rotational speed. In the second rotational speed range, the correction factor which is assigned to the first rotational speed range is increasingly reduced further, preferably as far as zero, and equally the correction factor which is assigned to the second rotational speed range is increasingly enlarged further, as the rotational speed becomes increasingly distant from the limiting rotational speed. If, therefore, a mid rotational speed range is considered for example, the correction factor of this mid rotational speed range is all the smaller the more the rotational speed approaches the limiting rotational speed with respect to the next-higher rotational speed range, whereas in this mid rotational speed range the correction factor of the next-higher rotational speed range becomes increasingly greater as the rotational speed increasingly approaches the limiting rotational speed with respect to the next-higher rotational speed range. To put it yet another way, the rotational speed deviation of a rotational speed range under consideration therefore has all the less effect on the correction of the drag torque curve the more the rotational speed approaches a limiting rotational speed with respect to an adjacent rotational speed range; in return, the influence of the rotational speed deviation of the adjacent rotational speed range on the correction in the rotational speed range under consideration increases all the more the more the rotational speed approaches the limiting rotational speed. In this way it can be prevented that discontinuities in the corrected drag torque curve occur at the limiting rotational speed between two adjacent rotational speed ranges because the correction factors of adjacent rotational speed ranges are to some extent adapted to one another.

According to a further embodiment, the reduction or increase in the correction factors of adjacent rotational speed ranges in the predefined rotational speed band about the limiting rotational speed between two adjacent rotational speed ranges takes place on the basis of so-called initial functions in that each rotational speed range is assigned an initial function which is dependent on the rotational speed and by which the correction factor of the respective rotational speed range is multiplied. In this case, each initial function in the rotational speed range to which it is assigned may have a maximum function value, for example one, from which it decreases continuously, in the direction of an adjacent rotational speed range, to a function value of zero in the adjacent rotational speed ranges. The initial functions may therefore be for example a bell curve function, the function values of which decrease from a maximum value in both directions to a function value of zero, which they reach in their respective adjacent rotational speed range. Equally, the initial functions may for example be trapezoidal functions with linearly descending flanks. The initial functions should in this case be selected such that the sum of the function values of initial functions of adjacent rotational speed ranges has a value of one at each rotational speed, in order that there is no excessive or inadequate correction of the drag torque curve in the respective rotational speed band about a limiting rotational speed between two adjacent rotational speed ranges.

As already mentioned above, the correction factors are updated after each pass through the loop by means of a correction increment for the current pass through the loop. For this purpose, the rotational speed deviations of the respective rotational speed range may be determined in that rotational speed differences which are determined at different times between the measured rotational speed of the machine element and the rotational speed, calculated taking into account the already corrected drag torque curve, of the machine element in the respective rotational speed range are summed. The updating by means of the correction increments therefore takes place on the basis of the drag torque curve already corrected in the previous pass through the loop, in that this is used in the previous rotational speed range for the calculation of the rotational speeds. The correction factor updated by means of the respective correction increment may then be applied to the starting drag torque curve; as an alternative to this, it is possible to use the respective correction increment as the correction factor and to apply this to the already corrected drag torque curve.

For the sake of completeness, it should be noted at this point that, although the method according to the invention has been explained for correcting the drag torque curve of a torque transmission section of a vehicle drive train, the method can be used in a corresponding way for correcting the drag torque curve of any desired machine elements. All that is necessary for this purpose is that the respective machine element is set in rotation and subsequently left to itself, in order that it can run down freely until it comes to a standstill. During this running-down phase, the respectively associated rotational speed deviation is determined in a number of rotational speed ranges that are different from one another, in the way explained above, and on the basis of this deviation the drag torque curve of the machine element can then be corrected in the respective rotational speed range.

The invention also relates to a method for controlling a first clutch and a second clutch of a vehicle drive train, wherein, by opening the first clutch and the second clutch, the torque transmission section of the drive strand can be shut down, that is to say can be uncoupled from the drive train, and wherein, by closing the first clutch and subsequently closing the second clutch, the torque transmission section can be coupled into the drive train, in particular in order to transmit a torque to a secondary axle of the vehicle, wherein, in this control method, the closing of the first clutch and/or the closing of the second clutch takes place in dependence on the drag torque curve which, as explained above, is corrected or has been corrected.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. There now follows a description of the invention, purely by way of example, with reference to the drawing, in which:

FIG. 1 shows a schematic representation of a drive train of a vehicle with a switched-off all-wheel drive, in which the rear axle or secondary axle can be switched on and switched off;

FIG. 2 explains the decrease in rotational speed of the torque transmission section after uncoupling over time and also the ascertainment of the rotational speed deviation in individual rotational speed ranges;

Corresponding reference numerals indicate corresponding parts throughout the several views of the drawings.

DESCRIPTION

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
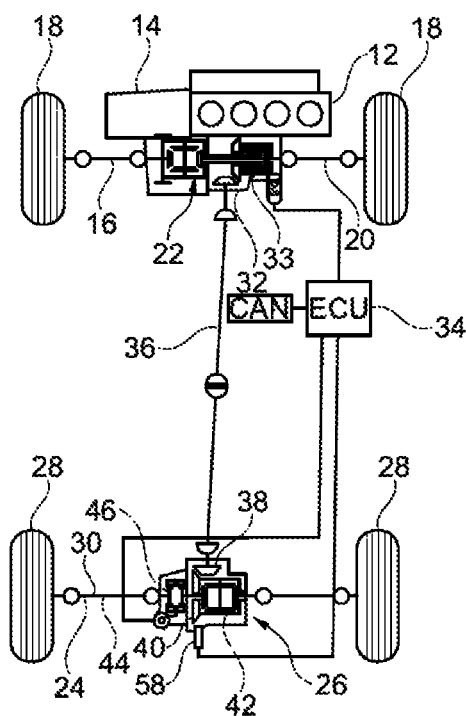

FIG. 1 illustrates the drive train of a motor vehicle, in the front region of which a drive unit 12 is arranged, which in the case of the embodiment represented is an internal combustion engine oriented transversely in relation to the longitudinal axis of the vehicle. The drive unit is permanently connected by means of a variable-speed gearbox 14 to a front axle 16 of the vehicle comprising a front axle differential 22, so that front wheels 18 that are connected effectively in terms of drive to the front axle 16 can be permanently driven by the drive unit 12 during the driving of the vehicle. The front axle 16 consequently forms a primary axle 20.

In a rear region of the vehicle, the motor vehicle has a rear axle 24 with a rear axle differential 26 and rear wheels 28. The rear axle 24 forms a secondary axle 30, since in all-wheel operation it is driven by the drive unit 12. Arranged for this purpose on the primary axle 20 is a controllable torque branching device 32, by which an adjustable proportion of the drive torque provided by the drive unit 12 can be branched off to the secondary axle 30. The torque branching device 32 comprises for this purpose an all-wheel clutch 33, which is designed as a multidisc clutch and is controlled by a control unit 34.

The output of the multidisc clutch 33 is connected to one end of a torque transmission section 36, which comprises, inter alia, a cardan shaft. At its other end, the torque transmission section 36 is connected to a bevel gear 38, which is in engagement with a ring gear 40, which is connected to a differential cage 42 of the rear axle differential 26.

In order to prevent the torque transmission section 36, including the differential cage 42, from unnecessarily also being able to rotate and consume energy when driving with the multidisc clutch 33 open, i.e. in the case of purely front-wheel drive, a device for shutting down the torque transmission section 36 is provided. In the case of this exemplary embodiment, the shutting-down device is formed by a dog clutch 46, which is arranged on a half axle 44 of the rear axle 24 in the vicinity of the rear axle differential 26, and likewise can be controlled by the control unit 34.

If the torque transmission section 36 has been shut down by means of the dog clutch 46 for driving purely with front-wheel drive, the torque transmission section 36 must first be synchronized with the secondary axle 30 before the dog clutch 46 can be engaged again for torque transmission for all-wheel drive. For this purpose, the multidisc clutch 33 is engaged in a controlled manner, in order in this way to bring the torque transmission section 36 up to speed again. The acceleration of the torque transmission section 36 should take place here as uniformly as possible, in order on the one hand to be able to determine precisely in advance the time at which the dog clutch 46 can/is to be engaged, and in order on the other hand not to adversely influence driving comfort, as could otherwise be the case with nonuniform acceleration of the torque transmission section. In order therefore to be able to bring the torque transmission section 36 up to speed as uniformly as possible, the most exact possible knowledge of the drag torque of the torque transmission section 36 is needed, which is dependent on the rotational speed of the same, as can be seen from the solid line in FIG. 3.

Figure 3:
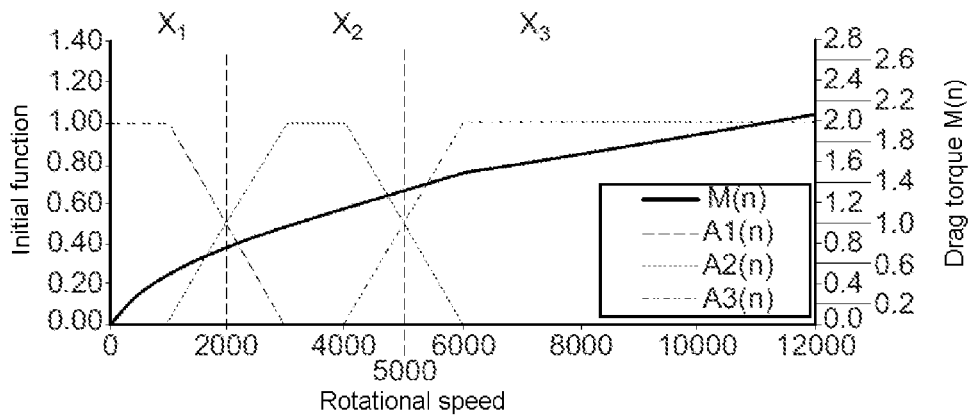
FIG. 3 shows on the one hand a given drag torque curve, dependent on the rotational speed, and on the other hand initial functions assigned to three rotational speed ranges.

The drag torque curve M(n) represented in FIG. 3 may be for example a drag torque curve that is predefined or ascertained on a vehicle test bench, which however can change over time owing to friction and wear. To be able to record the changing of the drag torque curve, and correct the drag torque curve correspondingly, according to the invention the entire rotational speed range which the torque transmission section 36 can run through is divided into a number of rotational speed ranges $X_i$ that are different from one another. In the case of the exemplary embodiment represented here, it is divided into three rotational speed ranges, to be specific a rotational speed range of low rotational speeds from 0 to 2000 rpm, a mid rotational speed range from 2000 to 5000 rpm and a speed range of high rotational speeds above 5000 rpm. In FIG. 3, these rotational speed ranges are identified by $X_1$, $X_2$ and $X_3$. The division of the drag torque curve M(n) into a number of rotational speed ranges takes place here in order to be able to correct the drag torque curve section by section, or in each rotational speed range $X_i$ on its own. For this purpose, in each rotational speed range $X_i$ a rotational speed deviation $N_i$ is ascertained, obtained in the respective rotational speed range $X_i$ between a measured rotational speed of the torque transmission section 36 and a calculated rotational speed, so that the drag torque curve M(n) can be corrected on the basis of this rotational speed deviation $N_i$ in the respective rotational speed range $X_i$.

Figure 2:
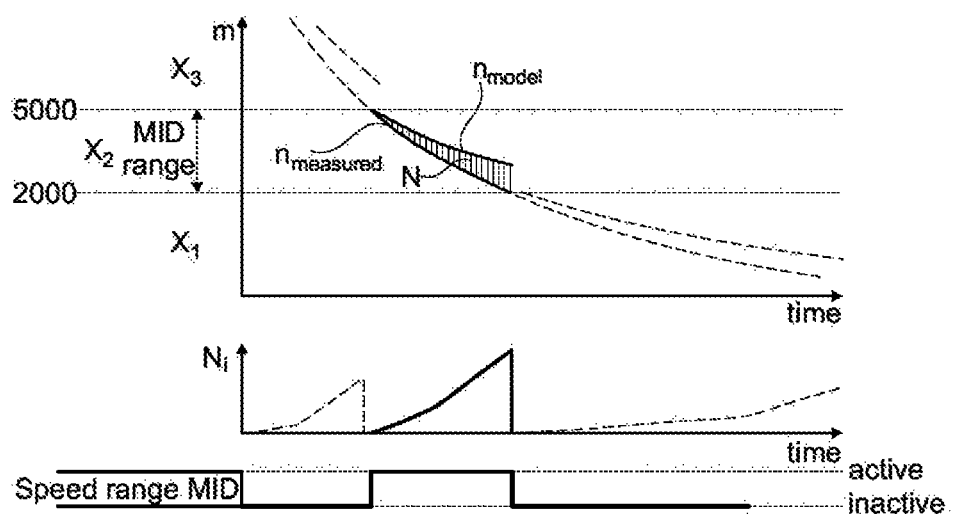

For calculating these rotational speed deviations $N_i$, therefore, after the uncoupling of the torque transmission section 36, i.e. after the release of the two clutches 33, 46, the running down of the torque transmission section 36 is monitored, as can be seen in the upper representation of the diagram in FIG. 2, which illustrates the profile over time of the measured rotational speed $n_{measured}$. As can be seen from this representation, the rotational speed of the torque transmission section 36 decreases continuously after the uncoupling from the remaining drive train, to approach the value of zero. When doing so, the torque transmission section 36 over time runs through the three rotational speed ranges $X_3$, $X_2$ and $X_i$, which are separated from one another by the limiting rotational speeds 5000 rpm and 2000 rpm. In each of these rotational speed ranges $X_i$, a rotational speed deviation between the measured rotational speed $n_{measured}$ and a calculated rotational speed $n_{model}$ is thus calculated for the correction of the drag torque curve. For this purpose, at the beginning of each rotational speed range $X_i$ the calculated rotational speed $n_{model}$ is made equal to the measured rotational speed $n_{measured}$, as can be seen from the upper representation of the diagram in FIG. 2 from the mid rotational speed range $X_2$, where, on entering the mid rotational speed range, the calculated rotational speed $n_{model}$ is equal to the measured rotational speed $n_{measured}$ equal to 5000 rpm, so that, starting from this initialization value, the rotational speed can be calculated, inter alia, while taking into account the drag torque curve curve M(n).

The rotational speed deviation $N_i$ of each rotational speed range $X_i$ is thus calculated in that rotational speed differences that are obtained at different times between the measured rotational speed $n_{measured}$ and the calculated rotational speed $n_{model}$ in the respective rotational speed range $X_i$ are summed, as represented in the middle representation of the diagram in FIG. 2. The greater the ascertained rotational speed deviation $N_i$ is here in the respective rotational speed range $X_i$, the greater the actual profile of the drag torque curve deviates from the predefined profile in the respective rotational speed range $X_i$; the greater therefore the torque deviation $N_i$ is in the respective rotational speed range $X_i$, the more the predefined drag torque curve $M(n)$ in the respective rotational speed range $X_i$ must be corrected, the drag torque curve having to be increased or decreased according to whether the rotational speed deviation $N_i$ is positive or negative.

If the associated rotational speed deviation $N_i$ has been ascertained in the way described above for each rotational speed range $X_i$, a correction factor $K_X$ can subsequently be ascertained in dependence on the respective rotational speed deviation $N_i$ for the respective rotational speed range $X_i$ according to the following equation:

$$K_X(t+1)=K_X(t)+k_X, \quad (1)$$

where $K_X(t)$ is the correction factor from a previous pass through the loop for the correction of the drag torque curve, this value having been initialized to one. The component $k_X$ represents a correction increment, which is added to the correction factor from the previous pass through the loop in order to obtain the correction factor $K_X(t+1)$ for the current correction of the drag torque curve $M(n)$. The correction increment $k_X$ in this case establishes how strongly an ascertained rotational speed deviation $N_i$ is to have an effect on the correction of the drag torque curve $M(n)$. The correction increment $k_X$ is consequently a function of the rotational speed deviation $N_i$.

Figure 4:
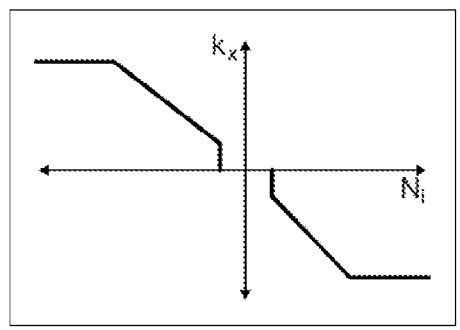
FIG. 4 shows a schematic representation of a function for ascertaining the correction increments.

A function, given by way of example, for determining the correction increment $k_X$ on the basis of the rotational speed deviation $N_i$ is represented for example in FIG. 4, from which it can be seen that the correction increment $k_X$ behaves substantially proportionally to the rotational speed deviation $N_i$. It can likewise be seen from FIG. 4 that negative rotational speed deviations $N_i$ result in a positive correction increment $k_X$ and positive rotational speed deviations $N_i$ result in a negative correction increment $k_X$, in order to be able to increase or decrease the drag torque curve according to the operational sign of the rotational speed deviation $N_i$.

With knowledge of the correction increment $k_X$ ascertained in this way for each rotational speed range $X_i$, the correction factor $K_X$ for the respective torque range $X_i$ can be ascertained on the basis of equation (1), so that subsequently the drag torque curve $M(n)$ in each rotational speed range $X_i$ can be multiplied by the associated correction factor $K_X$ for correction purposes.

In order however, when doing so, to avoid discontinuities in the profile of the corrected drag torque curve, in a predefined rotational speed band about a limiting rotational speed which separates a first rotational speed range from an adjacent second rotational speed range, for example in a rotational speed band about the limiting rotational speed 2000 rpm that separates the lower rotational speed range $X_i$ from the mid rotational speed range $X_2$, the drag torque curve $M(n)$ can be corrected on the basis of the two correction factors $K_X$ which are assigned to the two adjacent rotational speed ranges $X_1$ and $X_2$. For this purpose, for example, in the first rotational speed range $X_1$ the correction factor $K_{x1}$ which is assigned to the first rotational speed range $X_1$ is increasingly reduced and the correction factor $K_{x2}$ which is assigned to the second rotational speed range $X_2$ is increasingly enlarged as the rotational speed increasingly approaches the limiting rotational speed of 2000 rpm. Equally, in the second rotational speed range $X_2$, the correction factor $K_{x1}$ which is assigned to the first rotational speed range $X_1$ is increasingly reduced further, as far as zero, and the correction factor $K_{x2}$ which is assigned to the second rotational speed range $X_2$ is increasingly enlarged further, as the rotational speed becomes increasingly distant from the limiting rotational speed of 2000 rpm.

This modification of the correction factors $K_X$ takes place here according to the invention by means of so-called initial functions, which are represented in FIG. 3 as dashed and dotted line profiles. Each initial function $A_{Xi}$ is in this case dependent on the rotational speed and has a maximum function value equal to one, from which it steadily falls down to zero in the respective adjacent rotational speed range $X_i$. The initial functions $A_{Xi}$ are in this case selected such that the sum of the function values of the initial functions $A_{Xi}$ of adjacent rotational speed ranges $X_i$ has a value of one at each rotational speed n.

Figure 5:
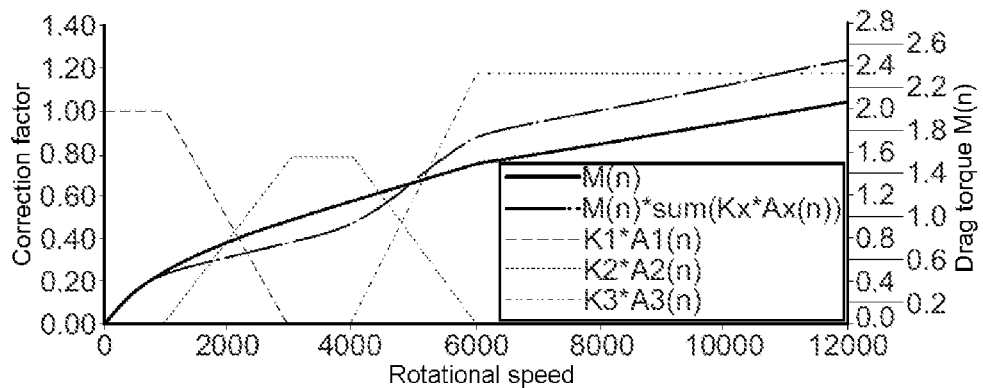
FIG. 5 shows correction factors modified by means of the initial functions and also the effect of these correction factors on the drag torque curve.

To be able to modify the correction factors $K_X$ of the individual torque ranges $X_i$ in a rotational speed band about the respective limiting rotational speeds, the initial functions $A_{Xi}$ are multiplied by the respectively associated correction factors $K_{Xi}$, which has the result that the correction factor $K_{Xi}$ of a respective rotational speed range also has an influence on the correction of the drag torque curve in an adjacent rotational speed range, as represented in FIG. 5, which shows, inter alia, the correction factors $K_{Xi}$ modified by means of the initial functions $A_{Xi}$ in dashed and dotted lines. Consequently, the initial functions $A_{Xi}$ have the effect to a certain extent of activating the correction factors $K_X$ in the respective rotational speed range, wherein this activation of the correction factor also acts on the adjacent rotational speed ranges $X_i$, since the initial functions $A_{Xi}$ extend into the respective adjacent rotational speed ranges.

The corrected drag torque curve $M_{corr}(n)$ is consequently calculated as $$M_{corr}(n)=M(n)\cdot\mathrm{sum}(K_{Xi}\cdot A_{Xi}(n)). \quad (2)$$

This corrected drag torque curve $M_{corr}(n)$ is represented in the diagram of FIG. 5 by dash-dotted lines and is obtained from the predefined drag torque curve $M(n)$, in that at each rotational speed n the predefined drag torque curve $M(n)$ is multiplied by the sum of the modified correction factors.

Once the corrected drag torque curve has been ascertained in this way, in a subsequent pass through the loop of the method the rotational speed of the torque transmission section in the respective rotational speed range X can be calculated on the basis of this corrected drag torque curve, in order to be able to determine from this the respective rotational speed deviation N while taking into account the measured rotational speed.

Once the drag torque curve has been corrected in the way described above, when later switching on the all-wheel drive or the secondary axle the multidisc clutch 33 can be engaged, while taking into account the corrected drag torque curve $M_{corr}(n)$, in such a way that the torque transmission section 46 is uniformly accelerated and brought up to speed. Equally, the clutch characteristic of the multidisc clutch 33 may be adapted, while taking into account the corrected drag torque curve, in order to be able to make the switching on of the all-wheel drive as smooth as possible.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for correcting a drag torque curve of at least one rotatable machine element of a torque transmission section of a vehicle drive train, the vehicle drive train coupled to a drive with a first clutch and coupled to an output of the vehicle with a second clutch, and a drag torque thereof, and therefore the drag torque curve, are dependent on a rotational speed of the machine element, wherein the drag torque curve has a plurality of rotational speed ranges which are different from one another, and wherein the drag torque curve in each of the rotational speed ranges is corrected between a measured rotational speed of the machine element and a calculated rotational speed of the machine element on the basis of a rotational speed deviation in the respective rotational speed ranges.

2. The method according to claim 1, wherein the drag torque curve in each of the rotational speed ranges is corrected in that a correction factor which is assigned to the respective rotational speed ranges is determined on the basis of a rotational speed deviation of the respective rotational speed ranges, and the drag torque curve is multiplied by the correction factor in the respective rotational speed ranges.

3. The method according to claim 1, wherein the rotational speed deviation of the respective rotational speed ranges is determined in that rotational speed differences which are determined at different times between the measured rotational speed of the machine element and the calculated rotational speed of the machine element in the respective rotational speed ranges are summed.

4. The method according to claim 1, wherein each of the rotational speed ranges of the measured rotational speed at first is used as a starting value for calculating the rotational speed.

5. The method according to claim 1, wherein in a predefined rotational speed band about a limiting rotational speed which separates a first rotational speed range from an adjacent second rotational speed range of the rotational speed ranges, the drag torque curve is corrected on the basis of two correction factors which are assigned to the two adjacent rotational speed ranges.

6. The method according to claim 5, wherein the correction of the drag torque curve in the predefined rotational speed band about the limiting rotational speed takes place between two of the adjacent rotational speed ranges in that in the first rotational speed range the correction factor which is assigned to the first rotational speed range is increasingly reduced and the correction factor which is assigned to the second rotational speed range is increasingly enlarged as the rotational speed increasingly approaches the limiting rotational speed, wherein, in particular in the second rotational speed range, the correction factor which is assigned to the first rotational speed range is increasingly reduced further, and the correction factor which is assigned to the second rotational speed range is increasingly enlarged further, as the rotational speed becomes increasingly distant from the limiting rotational speed.

7. The method according to claim 5, wherein the reduction or increase in the correction factors of adjacent rotational speed ranges in the predefined rotational speed band about the limiting rotational speed between the adjacent rotational speed ranges takes place on the basis of initial functions in that each rotational speed range is assigned an initial function which is dependent on the rotational speed and by which the correction factor of the respective rotational speed range is multiplied, wherein each initial function in the rotational speed range to which the initial function is assigned has a maximum function value from which the initial function decreases continuously, in the direction of an adjacent rotational speed range, to a function value of zero in the adjacent rotational speed range.

8. The method according to claim 7, wherein the initial functions are selected such that the sum of the function values of initial functions of adjacent rotational speed ranges has a value of one at each rotational speed.

9. The method according to claim 1, wherein after correction of the drag torque curve has taken place, correction factors which are assigned to the individual rotational speed ranges are updated on the basis of the rotational speed deviation of the respective rotational speed range, for which purpose the rotational speed deviation of the respective rotational speed range is determined in that the rotational speed differences which are determined at different times between the measured rotational speed of the machine element and the rotational speed, calculated taking into account the corrected drag torque curve, of the machine element in the respective rotational speed range are summed.

10. The method according to claim 1, wherein the rotational speed deviation in the respective rotational speed range is determined while rotational energy of the machine element is consumed as a result of the drag torque of the machine element.

11. A method for correcting a drag torque curve, comprising:
providing at least one rotatable machine element of a torque transmission section of a vehicle drive train, the vehicle drive train coupled to a drive with a first clutch and the vehicle drive train coupled to an output of the vehicle with a second clutch;
establishing a predefined drag torque curve for the at least one rotatable machine element;
dividing the drag torque curve into a plurality of rotational speed ranges; and
establishing a corrected drag torque curve based on a determined rotational speed deviation in each of the rotational speed ranges which is a difference between a measured rotational speed and a calculated rotational speed at each of the rotational speed ranges.

* * * * *